US012637637B2

(12) United States Patent
Choi

(10) Patent No.: US 12,637,637 B2
(45) Date of Patent: May 26, 2026

(54) METAL SURFACE TREATMENT COMPOSITION

(71) Applicant: Young Sik Choi, Glenside, PA (US)

(72) Inventor: Young Sik Choi, Glenside, PA (US)

( * ) Notice: Subject to any disclaimer, the term of this patent is extended or adjusted under 35 U.S.C. 154(b) by 0 days.

(21) Appl. No.: 19/196,376

(22) Filed: May 1, 2025

(65) Prior Publication Data

US 2025/0277170 A1 Sep. 4, 2025

Related U.S. Application Data

(62) Division of application No. 18/324,229, filed on May 26, 2023, now Pat. No. 12,312,568.

(60) Provisional application No. 63/346,037, filed on May 26, 2022.

(51) Int. Cl.

| | |
|---|---|
| ***C11D 7/12*** | (2006.01) |
| ***C11D 7/08*** | (2006.01) |
| ***C11D 7/16*** | (2006.01) |
| ***C11D 7/26*** | (2006.01) |
| ***C11D 7/50*** | (2006.01) |

(52) U.S. Cl.

CPC .................. *C11D 7/12* (2013.01); *C11D 7/08* (2013.01); *C11D 7/16* (2013.01); *C11D 7/268* (2013.01); *C11D 7/5022* (2013.01); *C11D 2111/14* (2024.01)

(58) Field of Classification Search

CPC .... C11D 7/12; C11D 7/08; C11D 7/22; C11D 7/16; C11D 7/268; C11D 2111/24

See application file for complete search history.

(56) References Cited

U.S. PATENT DOCUMENTS 5,990,065 A * 11/1999 Vinson .................... C11D 3/30 510/237
6,069,122 A * 5/2000 Vinson ................ C11D 3/0094 510/237
2002/0086039 A1* 7/2002 Lee ........................ A61Q 17/04 424/401
2009/0148342 A1* 6/2009 Bromberg ................ C11D 3/48 424/661
2014/0227202 A1* 8/2014 Pilgaonkar ............. A61Q 11/00 424/53
2015/0237738 A1* 8/2015 Wolfel ..................... H05K 3/10 174/251
2016/0010037 A1 1/2016 Wainman et al.
2017/0029743 A1 2/2017 Wainman et al.
2023/0038217 A1 2/2023 Moroney et al.
2023/0383217 A1* 11/2023 Choi ...................... C11D 7/268

FOREIGN PATENT DOCUMENTS

JP 2005154560 A 6/2005
WO WO-9919257 A2 * 4/1999 .............. C02F 1/283
WO WO-2013072932 A2 * 5/2013 ............. A61Q 11/00
WO 2015040445 A1 3/2015

OTHER PUBLICATIONS

Mesh & Micron particle conversion, particle sizes. (Year: 2025).*

* cited by examiner

*Primary Examiner* — Mark Eashoo
*Assistant Examiner* — M. Reza Asdjodi
(74) *Attorney, Agent, or Firm* — Volpe Koenig

(57) ABSTRACT

A method of making a surface treatment composition comprising preparing a first mixture comprising borax, baking soda, linseed oil and water and ripening the first mixture to prepare a first solution. The method also comprises preparing a second mixture comprising water, sweetener, and at least one of muriatic acid, ammonia, and mineral spirits and ripening the second mixture to prepare a second solution. The method also comprises preparing a third solution comprising water and at least one of liquid dish detergent or soap. The method also comprises combining the first solution, the second solution, and the third solution to form a fourth solution and ripening the fourth solution. The disclosure also relates to surface treatment compositions and methods of treating a surface.

5 Claims, 4 Drawing Sheets

METAL SURFACE TREATMENT COMPOSITION

CROSS-REFERENCE TO RELATED APPLICATION

This application is a divisional of U.S. patent application Ser. No. 18/324,229, filed May 26, 2023, which claims the benefit of U.S. Provisional Application No. 63/346,037, filed on May 26, 2022, the contents of each of which are incorporated by reference herein.

FIELD

This disclosure relates to compositions and methods for cleaning and refinishing of surfaces.

BACKGROUND

Material surfaces of many types may be spoiled over time. Iron and steel surfaces can rust. Tile surfaces may be soiled. Wooden surface finishes may change color or opacity. Stone of buildings, statues, fountains, or the like may accumulate grime.

The process of restoration often begins with removing accumulated corrosion or deposited substances. Further, the removal is often accomplished with physical or chemical means.

SUMMARY

In an aspect, the invention relates to a method of making a surface treatment composition. The method comprises preparing a first mixture comprising borax (sodium tetraborate decahydrate), baking soda, linseed oil and water and ripening the first mixture to prepare a first solution. The method also comprises preparing a second mixture comprising water, sweeter, and at least one of muriatic acid, ammonia, and mineral spirits and ripening the second mixture to prepare a second solution. The method also comprises preparing a third solution comprising water and at least one of liquid dish detergent or soap. The method also comprises combining the first solution, the second solution, and the third solution to form a fourth solution and ripening the fourth solution.

In an aspect, the invention relates to a composition comprising borax (sodium tetraborate decahydrate); baking soda; linseed oil; sweetener; at least one of muriatic acid, ammonia, vegetable oil, and mineral spirits; at least one of liquid dish detergent or soap; and water.

In an aspect, the invention relates to a method of treating a surface. The method comprises applying a surface treatment composition herein to the surface.

BRIEF DESCRIPTION OF THE DRAWINGS

The following detailed description of the preferred embodiment of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION

Figure 1A:
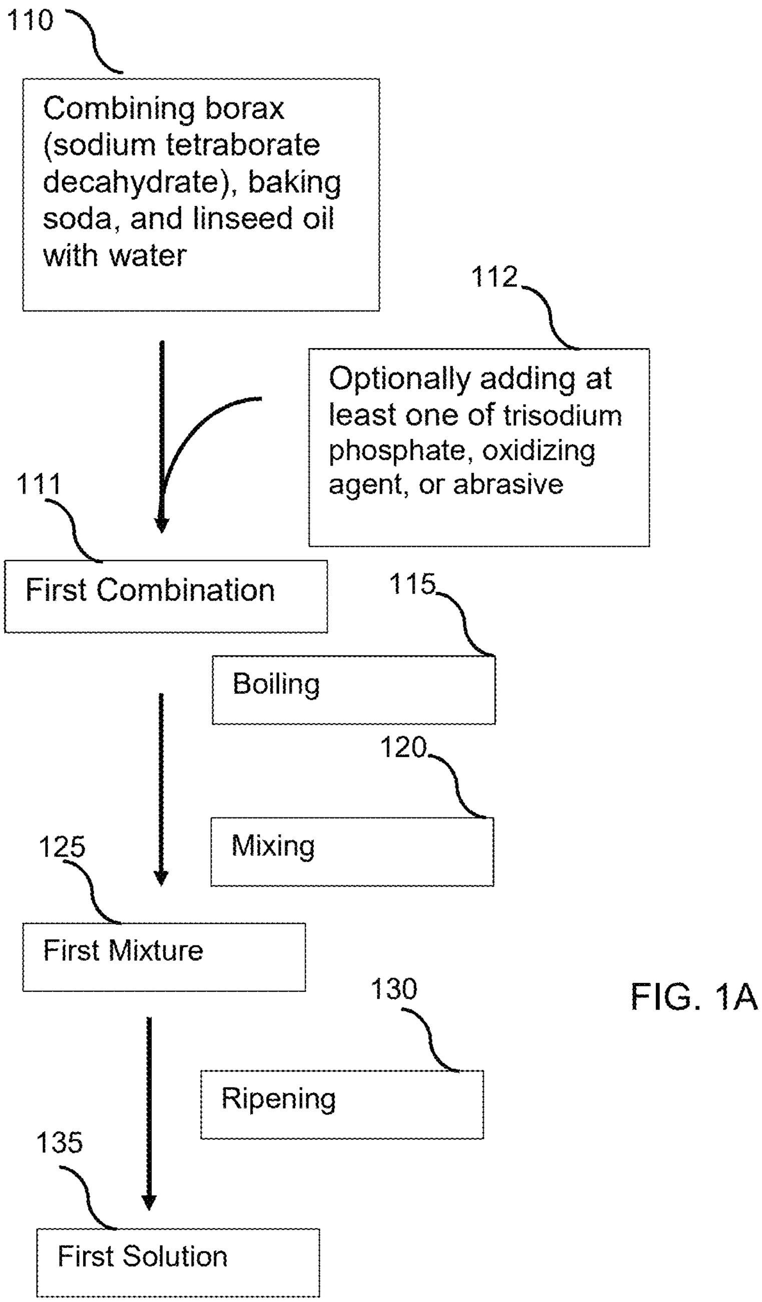
FIG. 1A illustrates a method of preparing a first solution for making a surface treatment composition.

Certain terminology is used in the following description for convenience only and is not limiting. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," or "A, B, and C," means any individual one of A, B, or C as well as any combination thereof.

Embodiments herein list measures of substances, concentration, numeric values in a ratio, volume, mass, time, temperature, or the like by specific values. In further embodiments, any measure herein may be adjusted in 1% increments of the specific value out to plus or minus 50% from the specific value. Still further embodiments may include a range of the measure selected from any two 1% increments from minus 50% of the specific value to plus 50% of the specific value; i.e., from 0.5× to 1.5× of the specific value. For example, a specific value of one cup in an embodiment may be adjusted in further embodiments to be any value from one half cup to one and one half cup, where the values are selected from 0.5 cup, 0.6, cup, 0.7 cup, 0.8 cup, 0.9 cup, 1.0 cup, 1.1 cup, 1.2 cup, 1.3 cup, 1.4 cup, and 1.5 cup. The specific value of one cup in a still further embodiment may be a range of values where the endpoints of the range are selected from 0.5 cup, 1.5 cup, and every 0.1 cup increment from 0.5 to 1.5 cup; that is, the endpoints may be selected from any two of 0.5 cup, 0.6, cup, 0.7 cup, 0.8, cup, 0.9 cup, 1.0 cup, 1.1 cup, 1.2 cup, 1.3 cup, 1.4 cup, and 1.5 cup. A particular embodiment may include only the specific values listed, only the values arrived at under the further embodiments, or only the values arrived at under the still further embodiments. A particular embodiment may include a combination at least two of the specific values listed, the values arrived at under the further embodiments, or the values arrived at under the still further embodiments.

The term "comprise," or its derivatives (comprising, comprises, or the like), means that the items gathered are part of the embodiment, but the embodiment may include any other element. Yet further embodiments herein include replacing one or more instance of "comprise," or its derivatives with "consists essentially of" (or "consisting essentially of" or the like) or "consists of" (or "consisting of" or the like). "Consists essentially of" means that the items gathered are those that do not change material operation or properties of the embodiment and are part of the yet further embodiment. "Consists of" means that only the listed items are part of the yet further embodiment.

Methods of making a surface treatment herein arrive at compositions that may be safer that prior compositions used for surface treatment, particularly rust removal. Likewise, compositions herein may be safer that prior compositions used for surface treatment, particularly rust removal. In addition, the compositions may be more effective and work within minutes, in some cases 1-2 minutes, which is unlike prior surface treatment compositions.

An embodiment comprises a method of making a surface treatment composition. The method comprises preparing a first mixture comprising borax (sodium tetraborate decahydrate), baking soda, linseed oil and water. The volume ratio of the first mixture components used to make the first mixture may be 1-2:1:1-2:80 of the borax, baking soda, linseed oil and water, respectively. The ratio may be 2:1:2:80. The ratio may be 1:1:1:80. The first mixture may further comprise at least one of trisodium phosphate, oxidizing agent, or abrasive. The volume ratio of the first mixture components used to make the first mixture may be 1-2:1:1-2:0.5:0.5:0.5:80 of the borax (sodium tetraborate decahydrate), baking soda, linseed oil, trisodium phosphate (when present), oxidizing agent (when present), sea salt (when present), abrasive (when present), and water. The ratio may be 2:1:2:0.5:0.5:0.5:80. The ratio may be 1:1:1:0.5:0.5:0.5:80. The method may also comprise ripening the first mixture to prepare a first solution. Ripening may comprise letting the first solution sit. The ripening may occur over a period of time. The period may be one day or two days. Ripening of the first solution may occur at room temperature.

The method of making a surface treatment composition also comprises preparing a second mixture comprising sweetener and at least one of muriatic acid, ammonia, optionally vegetable oil, mineral spirits, and water. The volume ratio of the muriatic acid, ammonia, vegetable oil (when present), sweetener, mineral spirits, and water used to prepare the second mixture may be 0.5-1:0.5-1:2:3:1.5-2:80, respectively. The ratio may be 1:1:2:3:2:80. The ratio may be 0.5:0.5:2:3:1.5:80. The second mixture may also comprise at least one of sea salt, turpentine, hydrogen peroxide, and acrylic paint. The volume ratio of the muriatic acid, ammonia, vegetable oil (when present), sweetener, sea salt, turpentine (when present), hydrogen peroxide (when present), acrylic paint (when present), mineral spirits, and water used to prepare the second mixture may be 0.5-1:0.5-1:2:3:1:0.5:2:2:1.5-2:80, respectively. The ratio may be 1:1:2:3:1:0.5:2:2:2:80. The ratio may be 0.5:0.5:2:3:1:0.5:2:2:1.5:80. The ammonia may be HDX® lemon scent, which comprises ammonia at 1-3% by weight. The sweetener may be Splenda® (95% dextrose and maltodextrin (by volume) plus sucralose [4,1,6-trichloro-galacto-sucrose]). The method may also comprise ripening the second mixture to prepare a second solution. Ripening may comprise letting the second solution sit. The ripening may occur over a period of time. The period may be one day, two days, about one day, or about two days. Ripening of the second solution may occur at room temperature. Ripening of the second solution may occur at 100° F.

The method of making a surface treatment composition also comprises preparing a third solution comprising water and at least one of liquid dish detergent or soap. The volume ratio of the liquid dish detergent or soap to water may be 0.5:80. The liquid dish detergent may be Palmolive®. The liquid dish detergent may comprise ammonium lauryl sulfate, sodium lauryl sulfate, methylisothiazolinone, glycol distearate, or cocamiode DEA. The water may be hot. The temperature of the hot water may be 100° F.

The method of making a surface treatment composition also comprises preparing a fourth mixture by mixing together the first solution, the second solution and the third solution. The method may also comprise ripening the fourth mixture to prepare the surface treatment composition. The ripening may comprise letting the fourth solution sit. The ripening may occur over a period of time, which may be for one, two, or three days. The ripening of the fourth solution may be at room temperature.

Referring to FIG. 1A, an embodiment comprises a method of making a surface treatment composition. The method comprises a step 110 of combining borax (sodium tetraborate decahydrate), baking soda, linseed oil with water to prepare a first combination 111. The volume ratio for components used in making the first combination may be 1-2:1:1-2:32 of the borax, baking soda, linseed oil and water, respectively. The ratio may be 2:1:2:32. The ratio may be 1:1:1:32. The amounts may be one cup borax, one cup baking soda, one cup linseed oil with two gallons of water. The water may be hot. The temperature of the hot water may be 250° F. The method may comprise a step 115 of boiling the first combination. The time of boiling may be 10, 15, 20, 25, 30, 35, or 40 minutes. The method may also comprise a step 120 of mixing the first combination with an additional three gallons of water to prepare a first mixture 125. The method may also comprise a step 130 ripening the first mixture to prepare a first solution 135. Ripening may comprise letting the first solution set. The ripening may occur over a period of time. The period may be two days, or about two days. Ripening may occur at room temperature. Ripening may occur with or without agitation.

The method of making a surface treatment composition may further comprise a step 112 of combining trisodium phosphate with the water to prepare the first combination. The volume ratio of the borax, baking soda, linseed oil, and trisodium phosphate and water in preparing the first combination may be 1-2:1:1-2:0.5-1:32, respectively. The ratio may be 2:1:2:1:32. The ratio may be 1:1:1:0.5:32. The amount of one the trisodium phosphate may be one half cup or one cup when the volume of water for the first combination is 32 cups (2 gallons).

The method of making a surface treatment composition may further comprise in step 112 combining oxidizing agent with the water to prepare the first combination. The volume ratio of the borax, baking soda, linseed oil, trisodium phosphate, oxidizing agent, and water in preparing the first combination may be 1-2:1:1-2:0.5-1:0.5-1:32, respectively. The ratio may be 2:1:2:1:1:32. The ratio may be 1:1:1:0.5:0.5:32. The amount of oxidizing agent may be one half cup or one cup when the volume of water for the first combination is 32 cups (2 gallons). The oxidizing agent may comprise a peroxide. The oxidizing agent may comprise a percarbonate. The oxidizing agent may comprise percarbonate, carbonate, hydrogen peroxide, and surfactants. The oxidizing agent may comprise sodium percarbonate, sodium carbonate, hydrogen peroxide, and surfactants. The oxidizing agent may comprise disodium carbonate, sodium percarbonate, and C12-C15 ethoxylated alcohols. The disodium carbonate may be at 55-63.4% (w/w). The sodium carbonate may be at 50-60% (w/w) or 55-63.4% (w/w). The sodium percarbonate may be at 23.5-38.4% (w/w). The C12-C15 ethoxylated alcohols may be at 2.7-3.14% (w/w). The foregoing concentrations are the values in the oxidizing agent prior to the combining the water. The oxidizing agent may comprise Oxi-Clean®.

The method of making a surface treatment composition may further comprise in step 112 combining an abrasive with the water to prepare the first combination. The volume ratio of the borax, baking soda, linseed oil, trisodium phosphate, oxidizing agent, abrasive, and water in preparing the first combination may be 1:1:1:0.5:0.5:0.5:32, respectively. The amount of abrasive may be one half cup when the volume of water for the first combination is 32 cups (2 gallons). The abrasive may comprise pumice stone. The pumice stone may be in the form of particles having mesh size in a range between and including two mesh sizes selected from 60, 120, 160, or 200. The particles may have a mesh size of 120. The abrasive may comprise Pumice Stone FF (Rainbow®).

Figure 1B:
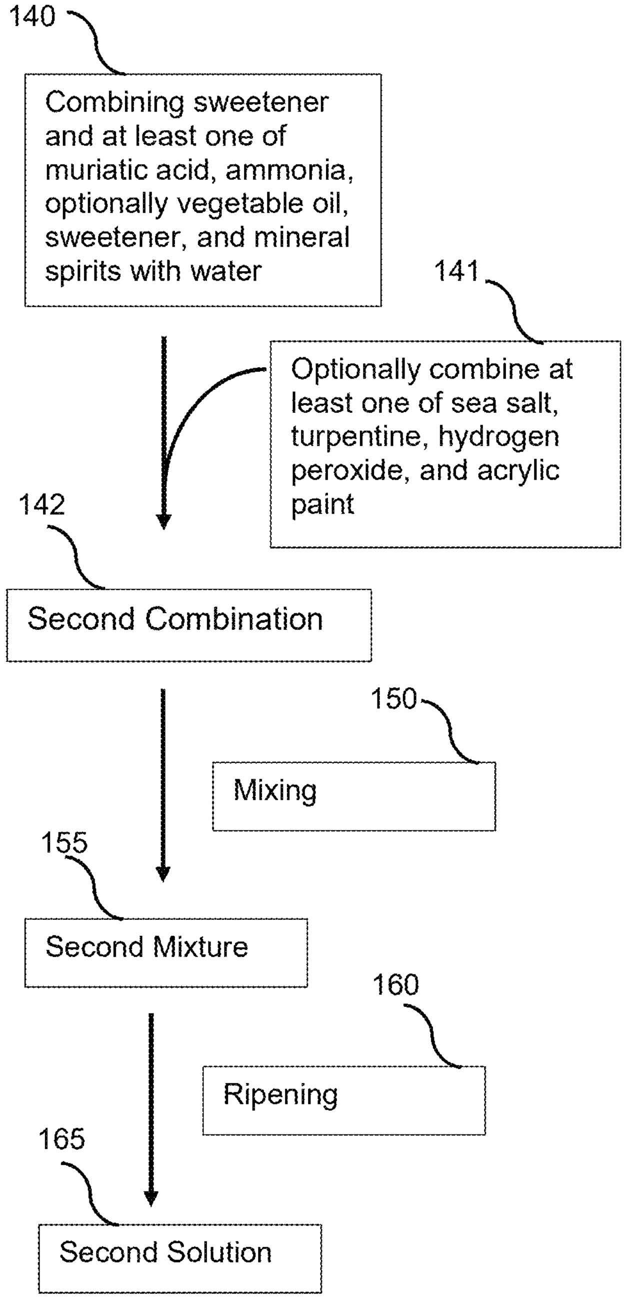
FIG. 1B illustrates a method of preparing a second solution for making a surface treatment composition.

Referring to FIG. 1B, the method of making a surface treatment composition also comprises a step 140 of combining sweetener and at least one of muriatic acid, ammonia, optionally vegetable oil, and mineral spirits with water to prepare a second combination 142. The volume ratio of the muriatic acid, ammonia, vegetable oil (when present), sweetener, mineral spirits, and water may be 0.5-1:0.5-1:2:3:1.5-2:32, respectively. The ratio may be 1:1:2:3:2:32. The ratio may be 0.5:0.5:2:3:1.5:32. The amounts may be one half cup to one cup muriatic acid, one half cup to one cup ammonia, two cup vegetable oil, three cups sweetener, one and one half cup to two cup mineral spirits, and 32 cups (two gallons) of water. The second combination may further comprise at least one of sea salt, turpentine, hydrogen peroxide, and acrylic paint, and the method optionally includes a step 141 of adding at least one of sea salt, turpentine, hydrogen peroxide, and acrylic paint. The ratio of the sea salt to water in preparation of the second combination may be 1:32. The ratio of the turpentine to water in preparation of the second combination may be 0.5:32. The ratio of hydrogen peroxide to water in preparation of the second combination may be 2:32. The ratio of acrylic paint to water in preparation of the second combination may be 2:32. The amount of sea salt, turpentine, hydrogen peroxide, or acrylic paint in preparing the second combination may be one cup, one half cup, two cup, or two cup, respectively, when the amount of water is two gallons. The ammonia may be a solution comprising 1-3% by weight ammonia. The ammonia may be HDX® lemon scent, which comprises ammonia at 1-3% by weight. The sweetener may be Splenda® (95% dextrose and maltodextrin (by volume) plus sucralose [4,1,6-trichloro-galacto-sucrose]). The method may also comprise a step 150 of mixing the second combination with an additional three gallons of water to prepare a second mixture 155. The water may be hot. The temperature of the hot water may be 80F, 90° F., 80°-90° F., or 100° F. The method may also comprise a step 165 of ripening the second mixture to prepare a second solution 165. The ripening may occur over a period of time, which may be one day or two days. The ripening may occur at room temperature.

Figure 1C:
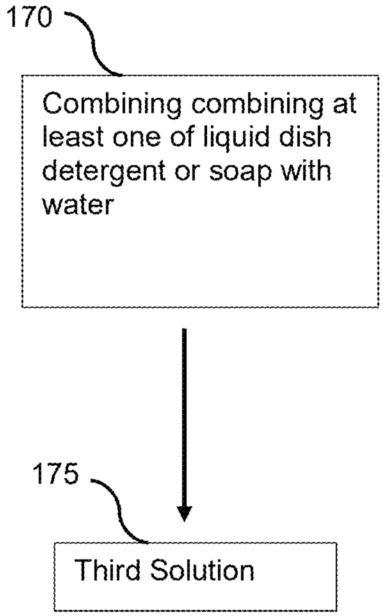
FIG. 1C illustrates a method of preparing a third solution for making a surface treatment composition.

Referring to FIG. 1C, the method of making a surface treatment composition also comprises a step 170 of combining at least one of liquid dish detergent or soap with water to prepare a third solution 175. The volume ratio of the liquid dish detergent or soap to water may be 0.5:16, 32, 48, 64, or 80, preferably 80. The amounts may be one half cup of liquid dish detergent or soap and 1, 2, 3, 4, or 5 gallons of water, preferably five gallons. The liquid dish detergent may be Palmolive®. The liquid dish detergent may comprise ammonium lauryl sulfate, sodium lauryl sulfate, methylisothiazolinone, glycol distearate, or cocamide DEA. The water may be hot. The temperature of the hot water may be 100° F.

Figure 1D:
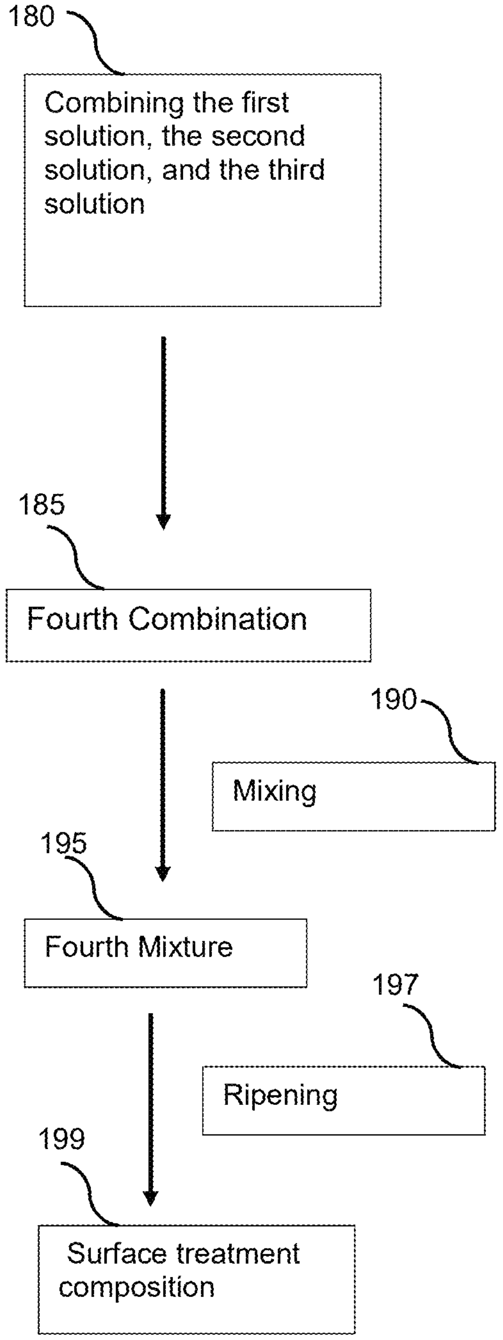
FIG. 1D illustrates a method of combining the first solution, the second solution, and the third solution to make the surface treatment composition.
Figure 2:
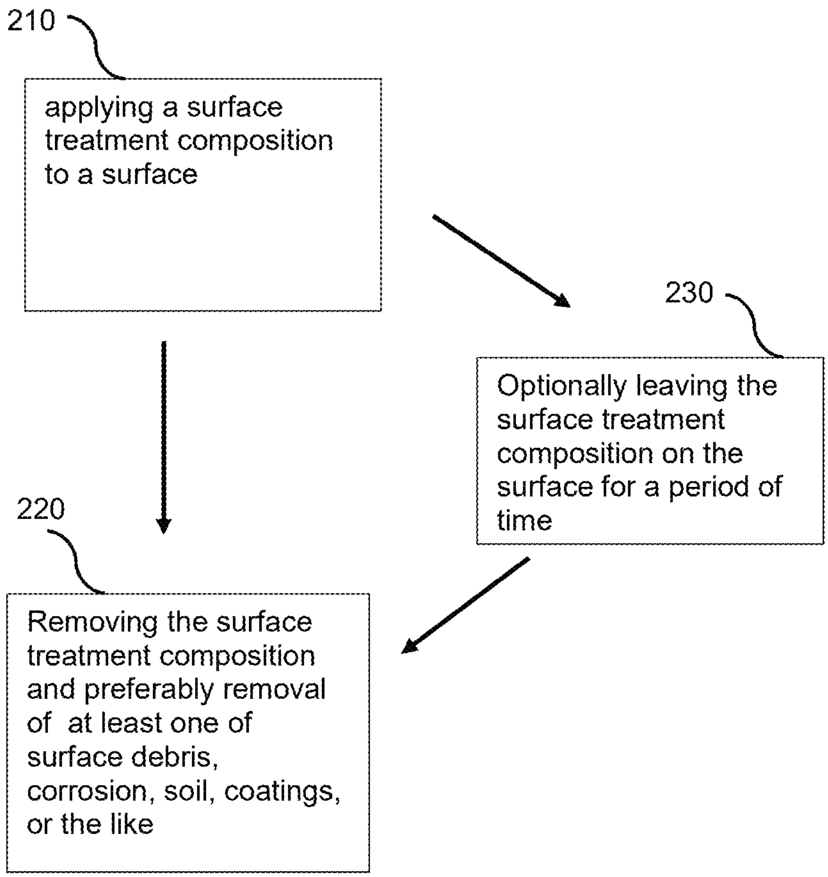
FIG. 2 illustrates a method of treating a surface.

Referring to FIG. 1D, the method of making a surface treatment composition also comprises a step 180 of combining the first solution, the second solution, and the third solution to prepare a fourth combination 185. The method may comprise a step 190 of mixing the fourth combination to prepare a fourth mixture 195. The method may also comprise a step 197 of ripening the fourth mixture to prepare the surface treatment composition 199. The ripening may occur over a period of time, which may be for one, two, or three days. The ripening may be at room temperature.

An embodiment comprises a method of making a surface treatment composition comprising: combining one cup borax, one cup baking soda, optionally ½ cup trisodium phosphate, optionally ½ cup of oxidizing agent, optionally ½ cup pumice stone FF, and one cup linseed oil with two gallons of water to prepare a first combination, and mixing the first combination with three additional gallons of water to prepare a first mixture, and ripening the first mixture for two days to prepare a first solution. The method may include boiling the first combination. The oxidizing agent may comprise sodium percarbonate, sodium carbonate, hydrogen peroxide, and surfactants. The oxidizing agent may comprise disodium carbonate, sodium percarbonate, and C12-C15 ethoxylated alcohols. The disodium carbonate may be at 55-63.4% (w/w). The sodium carbonate may be at 50-60% (w/w) or 55-63.4% (w/w). The sodium percarbonate may be at 23.5-38.4% (w/w). The C12-C15 ethoxylated alcohols may be at 2.7-3.14% (w/w). The method also comprises combining ½ cup muriatic acid, ½ cup ammonia, optionally 2 cup vegetable oil, three cups sweetener, optionally 1 cup sea salt, optionally ½ cup turpentine, optionally 2 cups hydrogen peroxide, optionally 2 cups acrylic paint, and 1½ cup mineral spirits with two gallons water to prepare a second combination, mixing the second combination with an additional three gallons of water to prepare a second mixture, and ripening the second mixture for one day or two days to prepare a second solution. The water added may be 80°-90° F. The ammonia may be a solution comprising 1-3% by weight ammonia. The ammonia may be HDX® lemon scent, which comprises ammonia at 1-3% by weight. The sweetener may comprise sucralose (4,1,6-trichloro-galacto-sucrose). The sweetener may be 95% dextrose and maltodextrin (by volume) plus sucralose [4,1,6-trichloro-galacto-sucrose]. The sweetener may be Splenda®. The method also comprises dissolving ½ cup of liquid dish detergent or soap in 1, 2, 3, 4, or 5 gallons, preferably 5, of water to prepare a third solution. The liquid dish detergent may comprise ammonium lauryl sulfate, sodium lauryl sulfate, methylisothiazolinone, glycol distearate, or cocamiode DEA. The liquid dish detergent or soap may be Palmolive®. The method also comprises combining the first solution, the second solution, and the third solution to prepare a fourth combination, mixing the fourth combination to prepare a fourth mixture, and ripening the fourth mixture for one, two, or three days to prepare the surface treatment composition.

An embodiment comprises a method of making a surface treatment composition comprising: combining one cup borax, one cup baking soda, ½ cup trisodium phosphate, ½ cup Oxi-clean®, ½ cup pumice stone FF, and one cup linseed oil with two gallons of water to prepare a first combination, mixing the first combination with three additional gallons of water to prepare a first mixture, and ripening the first mixture for one day or two days to prepare a first solution. The method also comprises combining ½ cup muriatic acid, ½ cup ammonia (HDX®) lemon scent, optionally 1 cup sea salt, optionally 2 cup vegetable oil, three cups Splenda®, optionally ½ cup turpentine, optionally 2 cups hydrogen peroxide, optionally 2 cups acrylic paint, and 1½ cup mineral spirits with two gallons of water to prepare a second combination, mixing the second combination with three additional gallons of water to prepare a second mixture, and ripening the second mixture for one day or two days to prepare a second solution. The method also comprises dissolving ½ cup of Palmolive® in five gallons of water to prepare a third solution. The method also comprises combining the first solution, the second solution, and the third solution, to prepare a fourth combination, mixing the fourth combination to prepare a fourth mixture, and ripening the fourth mixture for one day, two days, or three days to prepare the surface treatment composition.

An embodiment comprises any composition made by any method of making a surface treatment composition herein.

An embodiment comprises a first composition comprising borax (sodium tetraborate decahydrate), baking soda, linseed oil, and water. The volume ratio may be 1:1:1:32 of the borax, baking soda, linseed oil and water, respectively. The composition may further comprise at least one of trisodium phosphate, an oxidizing agent, and an abrasive. The volume ratio of the borax, baking soda, linseed oil, trisodium phosphate (when present), oxidizing agent (when present), abrasive (when present), and water may be 1-2:1:1-2:0.5-1:0.5-1:0.5:32, respectively. The ratio may be 2:1:2:1:1:1:32. The ratio may be 1:1:1:0.5:0.5.5:32. The measure in the above ratios may be cups. The oxidizing agent may comprise sodium percarbonate, sodium carbonate, hydrogen peroxide, and surfactants. The oxidizing agent may comprise disodium carbonate, sodium percarbonate, and C12-C15 ethoxylated alcohols. The disodium carbonate may be at 55-63.4% (w/w) in the oxidizing agent. The sodium carbonate may be at 50-60% (w/w) or 55-63.4% (w/w) in the oxidizing agent. The sodium percarbonate may be at 23.5-38.4% (w/w) in the oxidizing agent. The C12-C15 ethoxylated alcohols may be at 2.7-3.14% (w/w) in the oxidizing agent. The abrasive may comprise pumice stone. The pumice stone may be in the form of particles having mesh size in a range between and including two mesh sizes selected from 60, 120, 160, or 200. The particles may have a mesh size of 120. The abrasive may comprise Pumice Stone FF (Rainbow®). The first composition may be a first combination in a method herein. An embodiment comprises a first mixture composition comprising the products of mixing the first composition with additional water, adjusting the water from 32 parts to 80 parts. An embodiment comprises a first solution composition comprising the products of ripening the first mixture composition.

An embodiment comprises a second composition comprising water, sweetener at least one of muriatic acid, ammonia, optionally sea salt, optionally vegetable oil, optionally turpentine, optionally hydrogen peroxide, optionally acrylic paint, and mineral spirits. The volume ratio of the muriatic acid to the water may be 0.5-1:32, 0.5:32, or 1:32. The volume ratio of the ammonia to the water may be 0.5-1:32, 0.5:32, or 1:32. The volume ratio of the sea salt (when present) to the water may be 1:32. The volume ratio of the vegetable oil (when present) to the water may be 2:32. The volume ratio of the sweetener to the water may be 3:32. The volume ratio of the turpentine (when present) to the water may be 0.5:32. The volume ratio of the hydrogen peroxide (when present) to the water may be 2:32. The volume ratio of the acrylic paint to the water may be 2:32. The volume ratio of the mineral spirits to the water may be 1.5-2:32, 1.5:32, or 2:32. The measure in the foregoing ratios may be cups. The ammonia may be a solution comprising 1-3% by weight ammonia. The ammonia may be HDX® lemon scent, which comprises ammonia at 1-3% by weight. The sweetener may be Splenda® (95% dextrose and maltodextrin (by volume) plus sucralose [4,1,6-trichloro-galacto-sucrose]). The second composition may be a second combination in a method herein. An embodiment comprises a second mixture composition comprising the products of mixing the second composition with additional water. The additional water may adjust the 32 parts of water to 80 parts. An embodiment comprises a second solution composition comprising the products of ripening the second mixture composition.

An embodiment comprises a third composition comprising at least one of liquid dish detergent or soap and water. The summed volume of the at least one of liquid dish detergent or soap to the water volume ratio may be 0.5:80. The measure in the foregoing ratio may be cups.

An embodiment comprises a composition comprising borax (sodium tetraborate decahydrate); baking soda; linseed oil; at least one of muriatic acid, ammonia, sweetener, and mineral spirits; at least one of liquid dish detergent or soap; and water. The composition may further comprise at least one of vegetable oil, trisodium phosphate, an oxidizing agent, an abrasive, sea salt, turpentine, hydrogen peroxide, and acrylic paint. The following ratios refer to the starting volume of the listed constituent used in preparing the composition compared to the volume of water used in preparing in the composition. The volume ratio of the borax to the water may be 1-2:240, 1:240, or 2:240. The volume ratio of the baking soda to the water may be 1:240. The volume ratio of the linseed oil to the water may be 1-2:240, 1:240, or 2:240. The volume ratio of the muriatic acid to the water may be 0.5-1:240, 0.5:240, or 1:240. The volume ratio of the ammonia to the water may be 0.5-1:240, 0.5:240, or 1:240. The volume ratio of the sweetener to the water may be 3:240. The volume ratio of the mineral spirits to the water may be 1.5-2:240, 1.5:240, or 2:240. The summed volume of the at least one of liquid dish detergent or soap to the water volume ratio may be 0.5:240. The volume ratio of the vegetable oil (when present) to the water may be 2:240. The volume ratio of the trisodium phosphate (when present) to the water may be 0.5-1:240, 0.5:240, or 1:240. The volume ratio of the oxidizing agent (when present) to the water may be 0.5-1:240, 0.5:240, or 1:240. The volume ratio of the abrasive (when present) to the water may be 0.5:240. The volume ratio of the sea salt (when present) to the water may be 1:240. The volume ratio of the turpentine (when present) to the water may be 0.5:240. The volume ratio of the hydrogen peroxide to the water may be 2:240. The volume ratio of the acrylic paint to the water may be 2:240. The volume measured in the foregoing ratios may be cups. The oxidizing agent may comprise sodium percarbonate, sodium carbonate, hydrogen peroxide, and surfactants. The oxidizing agent may comprise disodium carbonate, sodium percarbonate, and C12-C15 ethoxylated alcohols. The disodium carbonate may be at 55-63.4% (w/w) in the oxidizing agent. The sodium carbonate may be at 50-60% (w/w) or 55-63.4% (w/w) in the oxidizing agent. The sodium percarbonate may be at 23.5-38.4% (w/w) in the oxidizing agent. The C12-C15 ethoxylated alcohols may be at 2.7-3.14% (w/w) in the oxidizing agent. The abrasive may comprise pumice stone. The pumice stone may be in the form of particles having mesh size in a range between and including two mesh sizes selected from 60, 120, 160, or 200. The particles may have a mesh size of 120. The abrasive may comprise Pumice Stone FF (Rainbow®). The ammonia may be a solution comprising 1-3% by weight ammonia. The ammonia may be HDX® lemon scent, which comprises ammonia at 1-3% by weight. The sweetener may be Splenda® (95% dextrose and maltodextrin (by volume) plus sucralose [4,1,6-trichloro-galacto-sucrose]).

An embodiment comprises a method of treating a surface. The method may comprise a step 210 of applying any surface treatment composition herein to the surface. The method may comprise a step 220 of removing the surface treatment composition from the surface. The surface treatment composition may be prepared by any method of making a surface treatment composition herein. The method may comprise a step 230 of leaving the surface treatment composition on the surface for a period of time prior to the removing. The period of time may be two to three minutes. The removing may comprise spraying off the surface treatment composition. The spraying may comprise spraying water. The removing may comprise brushing off the surface treatment composition. The brushing off may comprise brushing the surface with a brush. The brush may be a brass brush. The removing may comprise scraping off the surface treatment composition. The removing may also comprise removal of surface debris, corrosion, soil, coatings, or the like. The surface may be but is not limited to a metal, brass, steel, iron, stone, brick, or wood surface. The surface may be at least partially covered by corrosion, soil, or a coating. The corrosion may comprise oxidation products. The soil may comprise at least one of dirt, grease, animal waste products, or plant residues. The coating may comprise at least one of paint, stain, varnish, a polymeric coating, polyurethane, or lacquer.

EMBODIMENT LISTING

The following listing is not limiting to embodiments otherwise described herein.

1. A method of making a surface treatment composition comprising: preparing a first mixture comprising borax (sodium tetraborate decahydrate), baking soda, linseed oil and water and ripening the first mixture to prepare a first solution; preparing a second mixture comprising water, sweeter, and at least one of muriatic acid, ammonia, and mineral spirits and ripening the second mixture to prepare a second solution; preparing a third solution comprising water and at least one of liquid dish detergent or soap; and combining the first solution, the second solution, and the third solution to form a fourth solution and ripening the fourth solution.

2. The method of embodiment 1, wherein the borax, baking soda, linseed oil and water for preparing the first mixture are at a volume ratio of 1-2:1:1-2:32, respectively; the sweetener and water for preparing the second mixture are at a volume ratio of 3:32; the muriatic acid, when present, and water for preparing the second mixture are at a volume ratio of 0.5-1:32; the ammonia, when present, and water for preparing the second mixture are at a volume ratio of 0.5-1:32; the mineral spirits, when present, and water for preparing the second mixture are at a volume of 1.5-2:32; the at least one of liquid dish detergent or soap and the water in the third solution are at a volume ratio of 0.5:80.

3. The method of embodiment 1 or 2, wherein the first mixture further comprises at least one of trisodium phosphate, an oxidizing agent, and an abrasive.

4. The method of embodiment 3, wherein the trisodium phosphate, when present, and water for preparing the first mixture are at a volume ratio of 0.5-1:32, the oxidizing agent, when present, and water for preparing the first mixture are at a volume ratio of 0.5-1:32; and the abrasive, when present, and water in the first mixture at a volume ratio of 0.5:32.

5. The method of embodiment 4, wherein the abrasive is pumice stone having mesh size in a range between and including two mesh sizes selected from 60, 120, 160, or 200.

6. The method of any of embodiments 1-5, wherein the second mixture further comprises at least one of sea salt, vegetable oil, turpentine, hydrogen peroxide, and acrylic paint.

7. The method of embodiment 6, wherein at least one of: the sea salt and water for preparing the second mixture are at a volume ratio of 1:32; the vegetable oil and water for preparing the second mixture are at a volume ratio of 2:32; the turpentine and water for preparing the second mixture are at a volume ratio of 0.5:32; the hydrogen peroxide and water for preparing the second mixture are at a volume ratio of 2:32; and the acrylic paint and water for preparing the second mixture are at a volume ratio of 2:32.

8. The method of any of embodiments 1-7, wherein the water in the ripening of the first mixture occurs over 1-2 days, the ripening of the second mixture occurs over 1-2 days, and the ripening of the fourth mixture occurs over 1-2 days.

9. The method of embodiment 1, wherein in the step of preparing the first mixture, the water comprises a first portion and a second portion, and preparing the first composition comprises combining the borax (sodium tetraborate decahydrate), baking soda, and linseed oil with the first portion of the water to form a first combination, boiling the first combination, and mixing the first combination with the second portion of water to form the first mixture; and in the step of preparing the second mixture, the water comprises a third portion and a fourth portion, an preparing the second combination comprises combining the third portion of the water, sweeter, and at least one of muriatic acid, ammonia, and mineral spirits, and mixing the first combination with the fourth combination of water to from the second mixture.

10. The method of embodiment 9, wherein the fourth portion of water is 80° F.-90° F. prior to the mixing.

11. The method of any of embodiments 1-10, wherein the sweetener is 95% dextrose and maltodextrin (by volume) plus 4,1,6-trichloro-galacto-sucrose.

12. A composition comprising borax (sodium tetraborate decahydrate); baking soda; linseed oil; sweetener; at least one of muriatic acid, ammonia, vegetable oil, and mineral spirits; at least one of liquid dish detergent or soap; and water.

13. The composition of embodiment 12 further comprise at least one of trisodium phosphate, an oxidizing agent, an abrasive, sea salt, turpentine, hydrogen peroxide, and acrylic paint.

14. The composition of embodiment 13, wherein the oxidizing agent comprises sodium percarbonate, sodium carbonate, hydrogen peroxide, and surfactants.

15. The composition of embodiment 13 or 14, wherein the abrasive comprises pumice stone having mesh size in a range between and including two mesh sizes selected from 60, 120, 160, or 200.

16. The composition of any of embodiments 12-15, wherein the sweetener is 95% dextrose and maltodextrin (by volume) plus 4,1,6-trichloro-galacto-sucrose.

17. A method of treating a surface comprising applying a surface treatment composition to the surface, wherein the surface treatment composition is the product of any one of embodiments 1-11, or the composition of any one of embodiments 12-16.

18. The method of embodiment 17 further comprising removing the surface treatment composition from the surface.

19. The method of embodiment 17 or 18 further comprising removing at least one of surface debris, corrosion, soil, or coatings from the surface.

20. The method of any of embodiments 17-19, wherein the surface is selected from the group consisting of metal, brass, steel, iron, stone, or brick.

21. A method of making a surface treatment composition comprising:

combining one cup borax (sodium tetraborate decahydrate), one cup baking soda, one cup linseed oil with two gallons of hot water to prepare a first combination, mixing the first combination to prepare a first mixture, and ripening the first mixture for two days to prepare a first solution;

combining at least one of ½ cup muriatic acid, ½ cup ammonia (HDX) lemon scent, 2 cup vegetable oil, three cups Splenda, ½ cup turpentine, and 1½ cup mineral spirits with two gallons of hot water to prepare a second combination, mixing the second combination to prepare a second mixture, and ripening the second mixture for two days to prepare a second solution;

combining ½ cup of liquid dish detergent or soap with one gallon of hot water to prepare a third solution; and combining the first solution, the second solution, and the third solution, with ¾ of a gallon of hot water to prepare a fourth combination, mixing the fourth combination to prepare a fourth mixture, and ripening the fourth mixture for three days to prepare the surface treatment composition.

22. The method of embodiment 21 further comprising combining ½ cup trisodium phosphate with the two gallons of hot water to prepare the first combination.

23. The method of embodiment 21 or 22 further comprising combining ½ cup oxidizing agent with the two gallons of hot water to prepare the first combination.

24. The method of embodiment 23, wherein the oxidizing agent comprising a peroxide.

25. The method of embodiment 23, wherein the oxidizing agent comprises a percarbonate.

26. The method of embodiment 23, wherein the oxidizing agent comprises disodium carbonate, sodium percarbonate, and C12-C15 ethoxylated alcohols.

27. The method of embodiment 26, wherein disodium carbonate is at 55-63.4% (w/w), sodium percarbonate is at 23.5-38.4% (w/w), and C12-C15 ethoxylated alcohols are at 2.7-3.14% (w/w) in the oxidizing agent prior to the combining with the two gallons of hot water.

28. The method of embodiment 27, wherein the oxidizing agent comprises Oxi-Clean®.

29. The method of any one of embodiments 21-28 further comprising combining an abrasive with the two gallons of hot water to prepare the first combination.

30. The method of embodiment 29, wherein the abrasive comprises pumice stone.

31. The method of embodiment 30, wherein the pumice stone is in particles having mesh size in a range between and including two mesh sizes selected from 60, 120, 160, or 200.

32. The method of embodiment 31, wherein the particles have a mesh size of 120.

33. The method of embodiment 32, wherein the abrasive is Pumic Stone FF (Rainbow®).

34. The method of any one of embodiments 21-33, wherein the liquid dish detergent or soap is Palmolive®.

35. A composition comprising the surface treatment composition prepared the method of any one of embodiments 21-34.

36. A method of treating a surface comprising:

applying (i) the surface treatment composition prepared by the method of any one of embodiments 21-34 or (ii) the composition of embodiment 35 to the surface;

leaving the (i) the surface treatment composition prepared by the method of any one of embodiments 21-34 or (ii) the composition of embodiment 35 on the surface for two to three minutes; and removing the (i) the surface treatment composition prepared by the method of any one of embodiments 21-34 or (ii) the composition of embodiment 35 from the surface.

37. The method of embodiment 36, wherein the removing comprises spraying off the (i) the surface treatment composition prepared by the method of any one of embodiments 21-34 or (ii) the composition of embodiment 35 from the surface.

38. The method of embodiment 37, wherein the spraying comprises spraying water.

39. The method of embodiment 37 or 38, wherein the removing comprises brushing off the (i) the surface treatment composition prepared by the method of any one of embodiments 21-34 or (ii) the composition of embodiment 35 from the surface.

40. The method of embodiment 39, wherein the brushing off comprises brushing the surface with a brush.

41. The method of embodiment 40, wherein the brush is a brass brush.

42. A method of making a surface treatment composition comprising:

combining one cup borax, one cup baking soda, ½ cup trisodium phosphate, ½ cup oxi clean, ½ cup pumice stone FF, and one cup linseed oil with two gallons of hot water to prepare a first combination, mixing the first combination to prepare a first mixture, and ripening the first mixture for two days to prepare a first solution;

combining ½ cup muriatic acid, ½ cup ammonia (HDX) lemon scent, 2 cup vegetable oil, three cups Splenda, ½ cup turpentine, and 1½ cup mineral spirits with two gallons of hot water to prepare a second combination, mixing the second combination to prepare a second mixture, and ripening the second mixture for two days to prepare a second solution;

dissolving ½ cup of Palmolive® in one gallon of hot water to prepare a third solution; and combining the first solution, the second solution, and the third solution, with ¾ of a gallon of hot water to prepare a fourth combination, mixing the fourth combination to prepare a fourth mixture, and ripening the fourth mixture for three days to prepare the surface treatment composition.

43. A composition comprising the surface treatment composition prepared the method of embodiment 42.

44. A method of treating a surface comprising:

applying (i) the surface treatment composition prepared by the method of embodiment 42 or (ii) the composition of embodiment 43 to the surface;

leaving the (i) the surface treatment composition prepared by the method of embodiment 42 or (ii) the composition of embodiment 43 on the surface for two to three minutes; and spraying off the (i) the surface treatment composition prepared by the method of embodiment 42 or (ii) the composition of embodiment 43 on the surface, and/or brushing off the (i) the surface treatment composition prepared by the method of embodiment 42 or (ii) the composition of embodiment 43 on the surface with a brass brush.

45. The method of any one of embodiments 36-41 or 44, wherein the surface is a brass surface.

46. The method of any one of embodiments 36-41 or 44, wherein the surface is a metal surface.

47. The method of any one of embodiments 36-41 or 44, wherein the surface is a steel surface.

48. The method of any one of embodiments 36-41 or 44, wherein the surface is an iron surface.

49. The method of any one of embodiments 36-41 or 44, wherein the surface is a stone surface.

50. The method of any one of embodiments 36-41 or 44, wherein the surface is a brick surface.

51. The method of any one of embodiments 36-41 or 44, wherein the surface is a wood surface.

52. The method of any one of embodiments 36-41 or 44, wherein the surface is a cement surface.

53. The method of any one of embodiments 36-41 or 44, wherein the surface is a stucco surface.

54. The method of any one of embodiments 36-41 or 44-53, wherein the surface is at least partially covered by corrosion, soil, or a coating.

55. The method of embodiment 54, wherein the corrosion comprising oxidation products.

56. The method of embodiment 54 or 55, wherein the soil comprises at least one of dirt, grease, animal waste products, or plant residues.

57. The method of any one of embodiments 54-56, wherein the coating comprises at least one of paint, stain, varnish, a polymeric coating, polyurethane, or lacquer.

It is understood, therefore, that this invention is not limited to the particular embodiments disclosed, but is intended to cover all modifications which are within the spirit and scope of the invention as defined by the appended claims; the above description; and/or shown in the attached drawings.

What is claimed is:

1. A composition for treating metal surfaces to remove corrosion comprising:

borax (sodium tetraborate decahydrate) at a volume ratio of 1:240 relative to water;

baking soda at a volume ratio of 1:240 relative to water;

linseed oil at a volume ratio of 1:240 relative to water;

sweetener at a volume ratio of 3:240 relative to water;

muriatic acid at a volume ratio of 0.5 to 1:240 relative to water;

ammonia at a volume ratio of 0.5 to 1:240 relative to water;

mineral spirits at a volume ratio of 1.5 to 2:240 relative to water;

liquid dish detergent or soap at a volume ratio of 0.5:240 relative to water; and 240 parts by volume water.

2. The composition of claim 1 further comprises at least one of trisodium phosphate, an oxidizing agent, an abrasive, sea salt, turpentine, hydrogen peroxide, and acrylic paint.

3. The composition of claim 2, wherein the oxidizing agent comprises sodium percarbonate and hydrogen peroxide as oxidizing components, and further comprises sodium carbonate and surfactants.

4. The composition of claim 2, wherein the abrasive comprises pumice stone having mesh size in a range between and including two mesh sizes selected from 60, 120, 160, or 200.

5. The composition of claim 1, wherein the sweetener is 95% dextrose and 5% maltodextrin plus 4, 1, 6-trichloro-galacto-sucrose.

* * * * *